United States Patent [19]

Adell

[11] 4,316,348

[45] * Feb. 23, 1982

[54] DOOR EDGE GUARD

[75] Inventor: Robert Adell, Novi, Mich.

[73] Assignee: U.S. Product Development Co., Novi, Mich.

[ * ] Notice: The portion of the term of this patent subsequent to Apr. 7, 1998, has been disclaimed.

[21] Appl. No.: 132,525

[22] Filed: Mar. 21, 1980

[51] Int. Cl.³ .............................................. B60J 5/00
[52] U.S. Cl. ........................................ 49/462; 52/716
[58] Field of Search ...................... 49/462; 52/716, 400

[56] References Cited

U.S. PATENT DOCUMENTS 3,293,803 12/1966 Boasen et al. ................... 52/400 X
3,340,224 9/1967 Sherman et al. .................. 52/400 X
4,259,812 4/1981 Adell ..................................... 49/462

*Primary Examiner*—Kenneth Downey
*Attorney, Agent, or Firm*—Olsen and Stephenson

[57] ABSTRACT

An ornamental and protective vehicle door edge guard comprises a metallic strip of generally U-shaped cross section which is self-retaining on the door. A non-metallic insulating strip of generally U-shaped cross section forms an insulating liner between the metallic strip and the door. The non-metallic strip is applied to the door edge by itself before the metallic strip and comprises a longitudinally conformable material which allows it to be readily conformed to the contour of the door edge. The free edges of the non-metallic strip seal between the free edges of the legs of the metallic strip and opposite sides of the door edge.

3 Claims, 4 Drawing Figures

DOOR EDGE GUARD

BACKGROUND AND SUMMARY OF THE INVENTION

This invention relates to ornamental and protective edge guards which are applied to the edges of sheet metal closures of an automotive vehicle, such as the vehicle's doors.

In a typical automotive vehicle, door edge guards are applied to the trailing edges of the vehicle's doors to protect the door edges from damage which might be caused by striking an object which may be present in a door's path when the door is opened. It is very desirable for such door edge guards to be made of bright metal, such as stainless steel, aluminum, or bimetal, due to the superior protective and ornamental characteristics of such materials. Furthermore, the inherent strength and resiliency of such metallic edge guards enable them to be self-retaining on the doors. Correspondingly, it is generally undesirable to use separate fasteners or adhesives in securing door edge guards to doors since they involve extra cost in labor and materials. It is also generally undesirable to use nonmetallic edge guards, such as vinyl edge guards, since they do not possess the superior protective, ornamental, and self-retention characteristics of the bright metallic edge guards. In connection with the usage of self-retaining door edge guards, it has heretofore been recognized that the potential for paint scratching and marring exists when the metallic edge guards are applied to vehicle doors. Such paint scratching can lead to premature corrosion of the door edge metal. A principal cause of this potential problem is attributable to the rather substantial dimensional variation in the thickness of the marginal edge of the door to which the edge guard is applied. Such variation is inherent in the prevailing method of constructing vehicle doors. Thus, a self-retaining door edge guard must be capable of accommodating a rather large range of door edge thicknesses, yet it must not cause paint scratching or marring on the door, and furthermore it must be readily installable on the assembly line, and it must be economical. Some of applicant's own prior inventions have addressed the paint scratching problem and provided solutions. For example, see applicant's own U.S. Pat. No. 2,704,687 in wich integral curls are formed at the extremities of the inner and outer legs of the edge guard.

A further cause of paint chipping is the denting of the metallic edge guard when in use. At this time it is generally not the self-retention characteristics of the edge guard which give rise to paint chipping, but rather the actual indentations at and near the bottom of the U-shaped edge guard which are caused by striking an object which may be present in a door's path when the door is opened. While a metallic door edge guard affords considerable protection and is definitely superior to an unguarded door edge, severe indentations may well chip the painted door edge underneath the edge guard in the vicinity of the crown of the door edge. This is an area which in general is less prone to paint damage caused by installation of an edge guard; however, it is more susceptible to chipping due to denting of the edge guard when in use because the paint is thinner on the crown of the door edge than on other areas of the door due to the fact that the crown has a relatively small radius of curvature. While any paint chipping which occurs underneath the metallic edge guard is unexposed to view, it can give rise, over the course of time, to other problems such as corrosion which unfortunately may become all too apparent. Hence, there exists a certain vulnerability when in use, even though a door edge guard may be perfectly installed at the factory without any paint chipping, scratching, or marring.

The present invention is directed to a new and improved edge guard for the edges of vehicle body closures which possesses the desirable characteristics of metallic edge guards, yet which avoids the paint damage problems referred to above. An edge guard embodying principles of the present invention can be readily installed on an automobile on an assembly line with a conventional tool and without the use of special tools, machines, or other devices. The present invention permits the use of metallic door edge guards of simple U-shape cross section, which means that a minimum amount of metal need be used. Prior edge guards, such as that disclosed in applicant's above-mentioned patent, require extra metal because of the integrally formed curls at the extremities of the inner and outer legs. Furthermore, fabrication of a metallic edge guard with curls is somewhat more complicated than fabrication of one without curls. The present invention possesses the further advantage of protectively insulating the edge guard metal from the door metal, and this is important in minimizing any tendency for electrochemical action to occur between the two where dissimilar metals are involved. The invention also provides a shock absorbing capability whereby dents to the metal edge guard which occur while in use are cushioned so as to offer substantially increased protection against paint chipping in the vicinity of the crown of the door edge. The free edges of a U-shaped non-metallic liner within the U-shaped metallic edge guard are shaped to seal between the legs of the metallic edge guard and the body closure.

The foregoing features, advantages, and benefits of the invention, along with additional ones, will be seen in the ensuing description and claims which should be considered in conjunction with the accompanying drawings. The drawings disclose presently preferred embodiments of the invention, and the disclosure sets forth the best mode presently contemplated for carrying out the invention.

DESCRIPTION OF THE PREFERRED EMBODIMENTS

Figure 1:
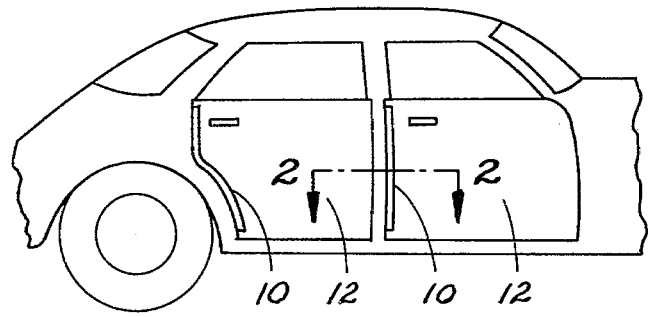
FIG. 1 is a fragmentary side elevational view of an automobile body showing edge guards on the doors in accordance with principles of the present invention.
Figure 2:
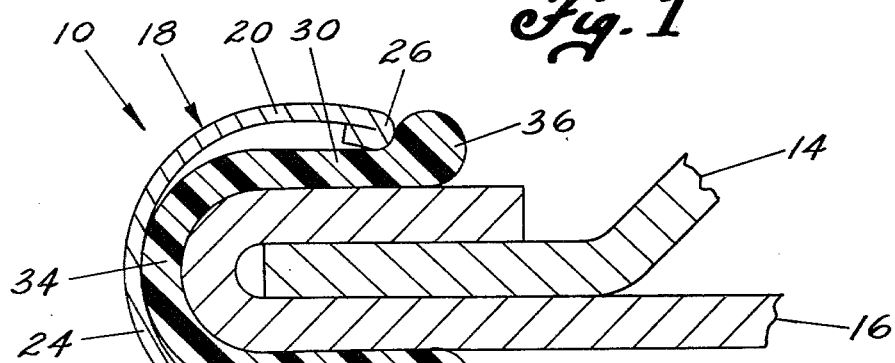
FIG. 2 is a fragmentary sectional view, on an enlarged scale, taken in the direction of arrows 2—2 in FIG. 1.

FIG. 1 ilustrates an ornamental and protective edge guard 10 embodying principles of the present invention applied to each of the doors 12 of an automobile. The shape of each edge guard corresponds to the shape of the trailing edge of the corresponding door to which it is applied, as can be seen in FIG. 1. The illustrated edge guards are shown to be coextensive in length with the trailing edges of the doors; however, they may be shorter, depending upon the specific requirements for a given model of automobile. As can be seen in FIG. 2, the typical door edge to which a door edge guard is applied includes an inner sheet metal door panel 14 around the free edge of which is wrapped the peripheral margin of an outer sheet metal door panel 16. For various reasons involved in the prevailing manufacture of vehicle doors, the thickness of the door edge, as represented by the letter A in FIG. 2 is subject to substantial variation in dimension. A satisfactory door edge guard must be capable of accommodating such substantial variations, which by way of example may range from about 0.110 inch to about 0.160 inch.

A first embodiment of door edge guard 10 embodying the present invention is shown in FIG. 2 installed on the edge of one of the vehicle doors 12. The edge guard comprises a metallic strip 18 of generally U-shaped cross section having an inner leg 20, an outer leg 22, and a bottom 24 joining the two legs. The extremity, or free end, of each leg is formed with a bead 26. A non-metallic strip 28 of generally U-shaped cross section forms an insulating liner between metallic strip 18 and the door edge. The non-metallic strip comprises an inner leg 30, an outer leg 32, and a bottom 34. Further, an integral bead 36 is provided at the free edge of each leg 30, 32. The illustrated beads 36 have generally rounded contours and each projects away from the door edge so as to have a portion which overlies and is in contact with the free edge of the corresponding metallic bead 26. The dimensions of the metallic strip are targeted to fit on a minimum thickness door edge with the legs 20, 22 applying a retention force against opposite sides of the door edge whereby the edge guard is self-retaining. The legs flex to fit on thicker doors. The portions of the legs 30,32 of the non-metallic strip which are immediately adjacent the beads 36 thereby are pressed against the sides of the door edge. Beads 36 further improve the sealing and insulating characteristics between the metallic strip and the door edge. The bead 36 on the outer leg will be visible to an observer. It may be shaped to present a clean, trim appearance to an observer, and it may be considered aesthetically pleasing in contemporary automobile design, which often incorporate plastic or rubber-like inserts in items such as trim strips, bumpers, etc. The bead may be even colored as desired, or it may be a natural color plastic presenting an opaque appearance. It is preferable that the bead project away from the door about the same distance as, or at most only slightly more than, the total thickness at the free edge of the metallic leg. Thus, when the beaded free edge 26 in FIG. 2 has a total thickness of 0.070 inch, for example, the bead 36 may have a diameter, or thickness, of 0.100 inch maximum for example. Of course other dimensions and shapes of beads can fall within the scope of the invention.

Figure 3:
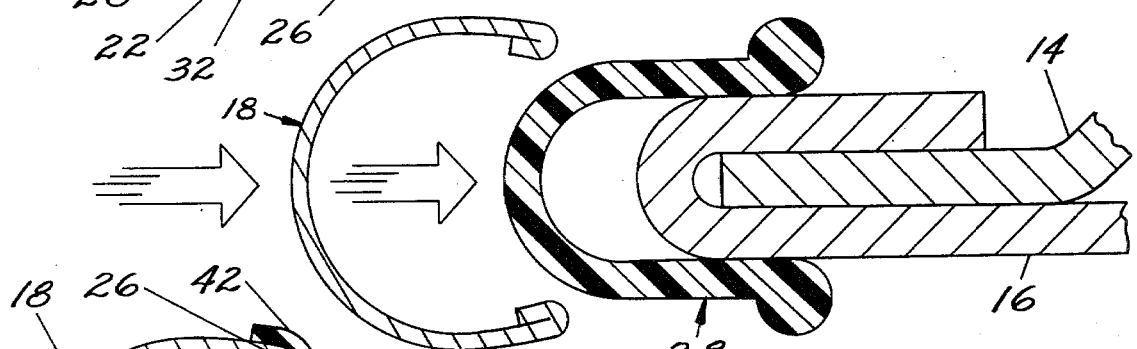
FIG. 3 is a view similar to FIG. 2 showing the installation procedure on a door edge.

FIG. 3 illustrates the preferred installation procedure. First, the non-metallic strip is applied by itself to the door edge. It is preferable that it be fully applied so that the bottom 34 abuts the crown of the door edge. One aspect of the present invention involves use of a conformable material for the insulating liner strip. It is possible, and indeed probable, that the contour of a door edge will be other than a simple straight line. The contour can extend fore and aft (i.e. right-left as viewed in FIG. 1) and side to side (i.e. into and out of the plane of FIG. 1). By selecting a conformable plastic or rubber-based compound, the liner can be extruded in the desired U-shaped cross section including the beads 36, cut to length, and conformed to the contour of the door edge by directly applying the extruded and cut strip to the door edge by itself. Thus, the non-metallic strip will flex without any significant memory, in possibly as many as four different directions, to adapt to the door edge contour. The general U-shaped cross section remains intact. Once the non-metallic strip has been so installed, the metallic strip 18 is applied over the non-metallic strip to the door edge. The two strips are so dimensioned that the free edges of the legs of the metallic strip abut the beads 36 of the non-metallic strip in the direction of application of the metallic strip to the door, thereby sealing and insulating the metal of the edge guard strip from the metal of the door. An important advantage is that electrochemical, or galvanic, action is avoided where the metallic strip and the door are dissimilar metals. Another advantage is that th liner cushions impacts which occur during use and this contributes toward elimination of the paint damage problems referred to above. In connection with the installation of the liner on the door edge, it should be mentioned that some installations may require adhesive to assist in securing the strip before the metallic strip is applied over it.

Figure 4:
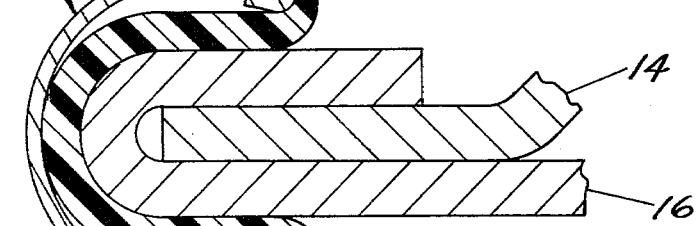
FIG. 4 is a view similar to FIG. 2 of another embodiment.

FIG. 4 illustrates another embodiment installed on a door edge. Like reference numerals designate similar parts in the drawing Figs. In the FIG. 4 embodiment, the free edges of the legs of the non-metallic strip are formed as smaller U-shaped channel sections 42, and the free edges of the legs of the metallic strip fit within these U-shaped channel sections. The two strips 18 and 28 may be designed and dimensioned to be fitted together first and then installed as a unit on a door edge. In this case, the non-metallic strip could be a vinyl plastic, for example. Alternatively, it is contemplated that the installation procedure described above could be employed.

While preferred embodiments of the invention have been disclosed and described, it will be appreciated that variations and modifications may be made to them and that there can be other specific embodiments within the scope of the invention.

What I claim as my invention is:

1. In a vehicle body having a painted sheet metal closure, such as a door, on a marginal edge of which is disposed an ornamental and protective metallic edge guard in the form of a strip of generally U-shaped cross section having inner and outer legs disposed on opposite sides of said marginal edge, the improvement which comprises a non-metallic strip of generally U-shaped cross section having inner and outer legs disposed on opposite sides of said marginal edge and which forms an insulating liner between said marginal edge and said metallic strip and which is disposed over said marginal edge by itself before the metallic strip is applied to said marginal edge, said non-metallic strip comprising at the free edge of at least one of its legs a bead which upon application of said metallic strip to said marginal edge over said non-metallic strip, is abutted by the free edge of the corresponding leg of said metallic strip in a direction which in cross section is generally in the direction of application of said metallic strip to said marginal edge.

2. In a vehicle body having a painted sheet metal closure, such as a door, on a marginal edge of which is disposed an ornamental and protective metallic edge guard in the form of a strip of generally U-shaped cross section having inner and outer legs disposed on opposite sides of said marginal edge, the improvement which comprises a longitudinally conformable non-metallic insulating strip conformed to the longitudinal contour of said marginal edge by application thereof by itself directly to said marginal edge before said metallic strip is applied to said marginal edge, said non-metallic strip forming an insulating liner precluding contact between the closure and said metalic strip with the free edges of the legs of the non-metallic strip sealing between the free edges of the legs of the metallic strip and the sides of said marginal edge.

3. In a vehicle body having a painted sheet metal closure, such as a door, on a marginal edge of which is disposed an ornamental and protective metallic edge guard in the form of a strip of generally U-shaped cross section having inner and outer legs disposed on opposite sides of said marginal edge, the improvement which comprises a non-metallic strip of generally U-shaped cross section having inner and outer legs disposed on opposite sides of said marginal edge and which forms an insulating liner between said marginal edge and said metallic strip and which is disposed over said marginal edge by itself before the metallic strip is applied to said marginal edge, said nonmetallic strip comprising at the free edge of at least one of its legs a portion which is disposed beyond the free edge of the corresponding leg of said metallic strip and which includes an overlying portion which in cross section extends away from said marginal edge to overlie the free edge of the corresponding leg of said metallic strip, with said overlying portion being disposed in contact with the free edge of the corresponding leg of said metallic strip.

* * * * *